March 15, 1949.    F. WEISS    2,464,627
METHOD FOR MAKING CAPACITORS

Original Filed Aug. 2, 1940    8 Sheets-Sheet 3

INVENTOR
F. Weiss
BY Edwards Bower & Pool
ATTORNEYS

March 15, 1949. F. WEISS 2,464,627
METHOD FOR MAKING CAPACITORS
Original Filed Aug. 2, 1940
8 Sheets-Sheet 4

INVENTOR
F. Weiss
BY
Edwards Bower Pool
ATTORNEYS

March 15, 1949. F. WEISS 2,464,627
METHOD FOR MAKING CAPACITORS
Original Filed Aug. 2, 1940 8 Sheets—Sheet 7

Patented Mar. 15, 1949

2,464,627

UNITED STATES PATENT OFFICE 2,464,627

METHOD FOR MAKING CAPACITORS

Felix Weiss, Brookline, Mass., assignor to Cornell-Dubilier Electric Corporation, a corporation of Delaware Original application August 2, 1940, Serial No. 349,725. Divided and this application June 30, 1944, Serial No. 542,927

6 Claims. (Cl. 154—80)

This invention relates to the assembling of electrical condensers of the type comprising stacked sheets of insulating and conducting material, such as mica and foil, and has for its principal object to provide for the rapid building of such condensers with accurate relative positioning of the component sheets.

In accordance with this invention the insulating and conducting material supplied in quantity is fed and interleaved intermittently and stacked in a selected number of layers to form the condensers which are thus completed and delivered.

The above and other features and objects will be understood from the following detailed description of an automatic machine operating in accordance with the invention and from the accompanying drawings of said machine in which.

Before proceeding with a detailed description the general organization of the machine is indicated as follows:

The machine is built on a frame 10 which supports the various parts. The condensers are stacked in a stacking nest 11 (Figs. 1, 6 and 7) which is located at the front central portion of the machine. This nest has fixed sides and corner pieces (Fig. 7) and is open at the bottom. The floor of the nest is constituted by any one of four rectangular platforms 12, 13, 14 and 15, each platform having a heel (12', 13', 14' and 15', respectively) extending vertically upward at the inner edge of the respective platforms and being held by an arm 16 extending from a disk 17 fixed to a rotatable shaft 18, so that the platforms are successively carried down within the sides of the nest, stacked with the condenser layers, and then carried out the bottom bearing the stacked condensers and delivering them into a suitable receptacle.

A hopper 19 (see Figs. 1 and 6) located in a vertical position behind the nest 11 contains insulating sheets, which in the description will be considered as mica, of the proper size to fit in the nest; and a hollow vacuum rod 20 is provided for carrying the mica sheets from the hopper to the nest.

The conducting sheets which are to be interleaved with the insulating sheets are obtained from rolls 21 and 22 of the conducting strip, ordinarily a metal foil, the rolls being located one on each side of the nest. These strips are fed into the nest at proper times to become interleaved with the mica sheets, and are cut off by knives 23 and 24, so that the ends of alternate foil sheets are left protruding from each end of the mica stack for connection with terminal leads.

Figure 2:
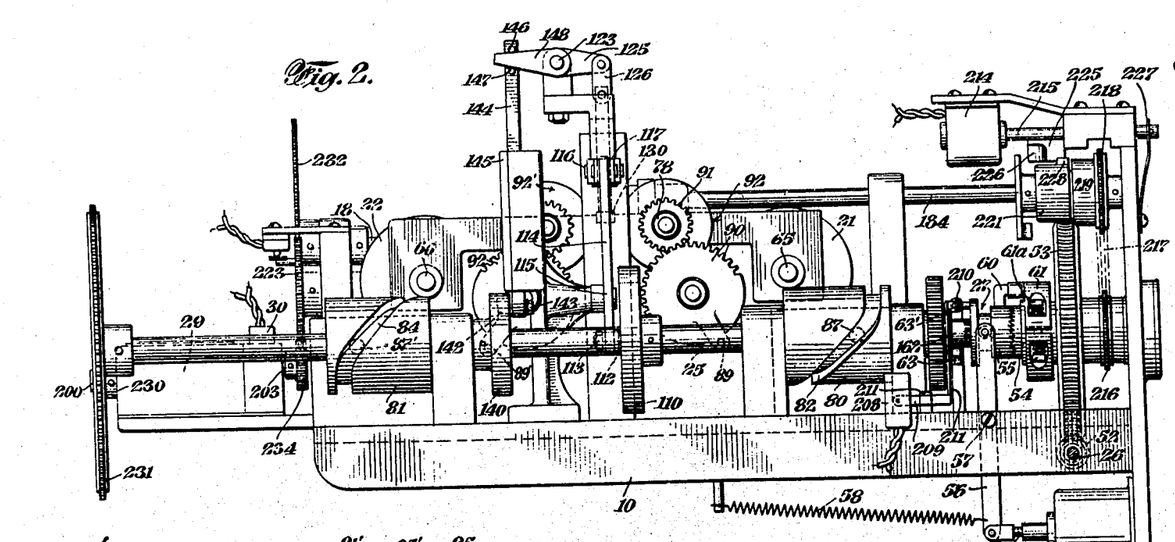
Fig. 2 shows a rear elevation of the machine.
Figures 3, 14:
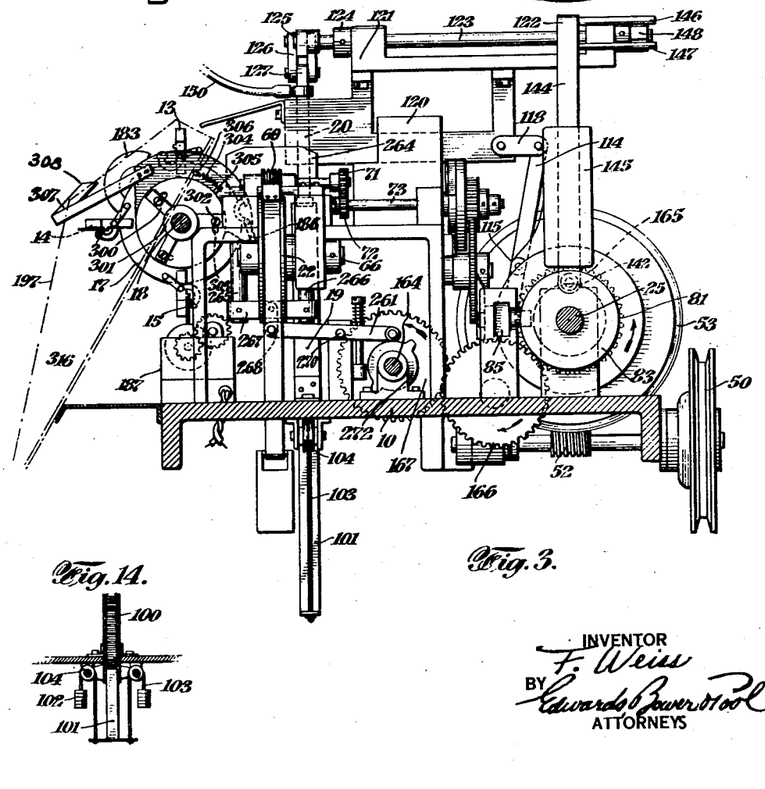
Fig. 3 shows a side sectional view of the machine taken at line 3—3 of Fig. 1.
Fig. 14 shows a detail of the under part of the mica sheet hopper used in the machine.

The mica and foil feeding mechanism is operated in synchronism by a main cam shaft 25 driven from a constantly driven shaft 26 through a clutch 27 which is controlled by a magnet 28 (see Fig. 2). A counter 29 of the type which can be preset to snap a switch 30 when a predetermined number of layers is stacked serves to operate the magnet to disengage clutch 27 when the number of layers corresponding to the counter setting has been stacked, and thus halt the stacking. Pursuant to the disengagement of this clutch, shaft 18 is automatically rotated for a quarter revolution to carry the platform bearing the stacked condenser down through the bottom of the nest and to move the next platform into position to receive a condenser stack. At the end of this movement of the stacking platforms the counter switch is again set to cause magnet 28 to engage clutch 27, thereby setting into operation the mechanism for stacking the next condenser.

Following is a more detailed description of the several parts of the machine.

The stacking nest

The nest 11 is formed by a rear wall 31 and two front corner pieces 32 and 33 fixed in an upright position on the frame. Vertical portions 34 and 35 integral with back wall 31 form two rear corners; and the four corners of the nest conform approximately with the rectangular size and shape of the insulating sheets to be stacked. (See the detailed Figs. 6, 7 and 8.) Overhanging the top of each of the four corners there is a ledge (36, 37, 38 and 39) which protrudes slightly into the path of travel of the mica corners in coming down into the nest, so that the rectangular mica sheets snap past these ledges.

Leading up to the nest from the two sides thereof are horizontal tables 252 and 253 fixed to the frame, the edges of these tables which extend toward the respective corner members 33, 35 and 32, 34 being sharp to cooperate with foil cutting knives 23 and 24, which are positioned to cut the foil strips at these table edges.

The front walls 40 and 41 of the front corner pieces (Figs. 6 and 7) are placed with sufficient clearance from the stacking platforms so that when the shaft is rotated, the stacking platforms may pass freely downward within these walls without binding, and the heel of the platform in the nest coincides with the front walls 40 and 41 of the nest. If this clearance be made small, the front walls 40 and 41 may be formed in the shape of a circular arc with the radius at the center of shaft 18, so that the inside of the platform will travel along this circular arc without binding against it. In front of the back wall 31 there is fastened a spring leaf 45 (Fig. 8), which urges the stacked mica sheets against the vertical heel 14' of the platform at the front of the nest.

Main drive

Referring to Figs. 1 to 4, a pulley 50 keyed to the worm shaft 26 is constantly driven by a belt 51 from a driving motor (not shown). This shaft has keyed to it a worm 52 which engages worm wheel 53 which is attached to a clutch member 54 of clutch 27. The members 53 and 54 are free to rotate on the main cam shaft 25 of the machine. This main shaft 25 is driven by clutch member 55 which is splined to the shaft; and the two clutch members 54 and 55 have cooperating teeth which are caused to engage with each other to drive the shaft when operating arm 56, forked to the clutch member 55, and pivoted to the frame at 57, is pulled by its spring 58. Arm 56 is operated by magnet 28 such that when the magnet is energized, the armature 59 attached to the arm is pulled toward the magnet against the tension of spring 58, thereby disengaging the clutch member 55 from 54.

Clutch member 55 has attached to it an arm 60 which is attached at its opposite end to a friction drive 61, adjustable by screw 61a, placed around the drum of clutch member 54, so that clutch member 55 is driven by the friction of the friction drive even when its teeth are disengaged from the teeth of member 54, except when lug 62 attached to the clutch member 55 strikes one of two stops 63 and 63' fastened to the frame, and spaced 180° apart around the shaft. When the teeth of clutch members 54 and 55 are engaged, these stops are not in the path of the lug 62; but when the clutch disengages, the lug moves endwise of the shaft with the splined member 55 until the stops lie in its path of rotation; so that the lug after moving endwise strikes the first stop in its path.

Foil feeding and cutting mechanism

For the purpose of feeding foil to the nest there are provided two spindles 65 and 66, attached to the frame, for holding the foil rolls 21 and 22 respectively, suitable brake bands 67 and 68 being provided for creating a suitable foil tension.

The foil strip from foil roll 22 is led between feed rolls 69 and 70 (Figs. 4 and 9) which are geared together by gears 71 and 72 fixed to their respective shafts 260 and 73 and driven from shaft 73. The upper roll 69 is grooved concentrically, and in these grooves are placed the prongs 250 of a stripper 251 (see Fig. 10) which is fastened over the plate 252 and spaced above the plate by suitable shims at the sides to allow the foil strip to feed between plate 252 and its stripper 251. Sufficient pressure is exerted between the rolls to feed the foil between them; and the proper pressure may be provided in any well-known manner, such as by regulating the number or size of shims between the bearing member of shaft 260 and the plate 252 to which it is attached. The foil from roll 21 is similarly led between rolls 74 and 75 geared together by gears 76 and 77 and driven by shaft 78; and a similar stripper is provided.

Figures 11, 15, 18:
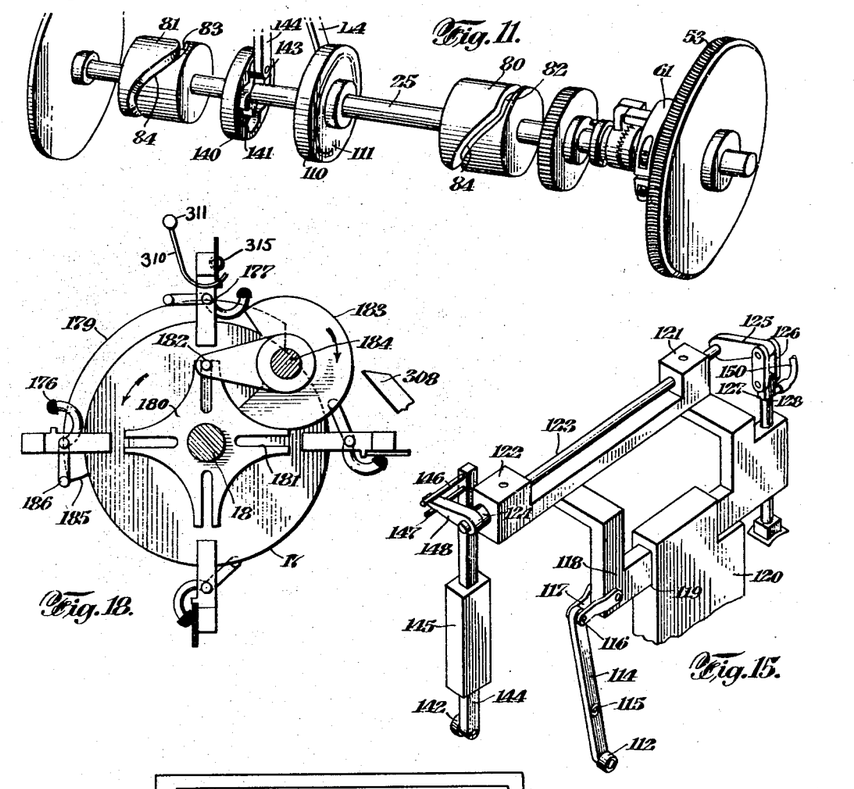
Fig. 11 shows a perspective of the main cam shaft with its cams and clutch drive.
Fig. 15 shows a perspective of the mechanical linkage mechanism for driving the mica conveyor.
Fig. 18 shows a detail of a Geneva movement for operating the condenser stacking platforms.
Figure 12:
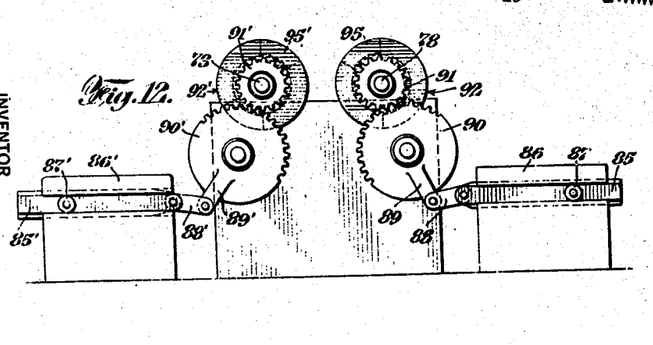
Fig. 12 shows a detail of the foil driving mechanism.
Figure 13:
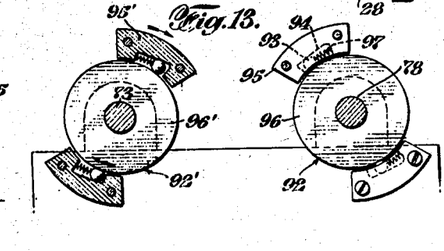
Fig. 13 shows a detail of a ratchet mechanism used in the foil feed drive.

The foil strips are led into the nest by intermittent movements created by a driving mechanism operated from the main cam shaft 25 (see Fig. 11). This comprises cams 80 and 81 keyed to shaft 25, each cam having a deep groove with a concentric portion 82 and two oblique portions 83 and 84. Each cam is provided with a cam follower comprising a horizontal arm 85 slidable in a fixed slide 86 (see Figs. 1 and 12) and carrying a roller 87 which engages in the cam groove, so that when shaft 25 rotates, the cam follower oscillates endwise of the shaft. The horizontal arm 85 has linked to its inner end a lever 88, the opposite end of which is linked to a boss 89 on a gear wheel 90 which is geared to a gear 91 freely rotatable on shaft 78. Shaft 78 is driven by gear 91 through a ratchet device 92 so that the shaft 78 turns only in one direction intermittently. Ratchet 92 is of the well-known spring-ball type as shown in Fig. 13 in which the balls 93 are held in a tapered recess 94 of a block 95, attached to gear 91, and against a hub 96 on shaft 78 by springs 97. The gear 91 rotates freely in the counterclockwise direction (with respect to Fig. 13) without driving shaft 78, but drives that shaft when rotating in the clockwise direction, due to the binding of the balls between the recess of the block and the hub, thus turning the foil feed rollers 74 and 75 intermittently in the feeding direction only.

The mechanism associated with cam 81 for driving the other foil feed shaft is similar, and the parts corresponding to parts 82 through 97 are given the same numbers but with a prime. The grooves of cams 80 and 81 are so related to each other that when the follower of cam 80 is moving to the left and thus feeding foil from roll 21', the follower of the other cam 81 is also moving to the left but is not feeding any foil from roll 22 because its spring-ball ratchet is not driving. But when the follower of cam 81 moves to the right, its spring-ball ratchet does drive and cause its foil feed rolls to rotate, while the other pair of feed rolls are not rotating.

Figures 8, 9, 23, 24, 25, 26, 27:
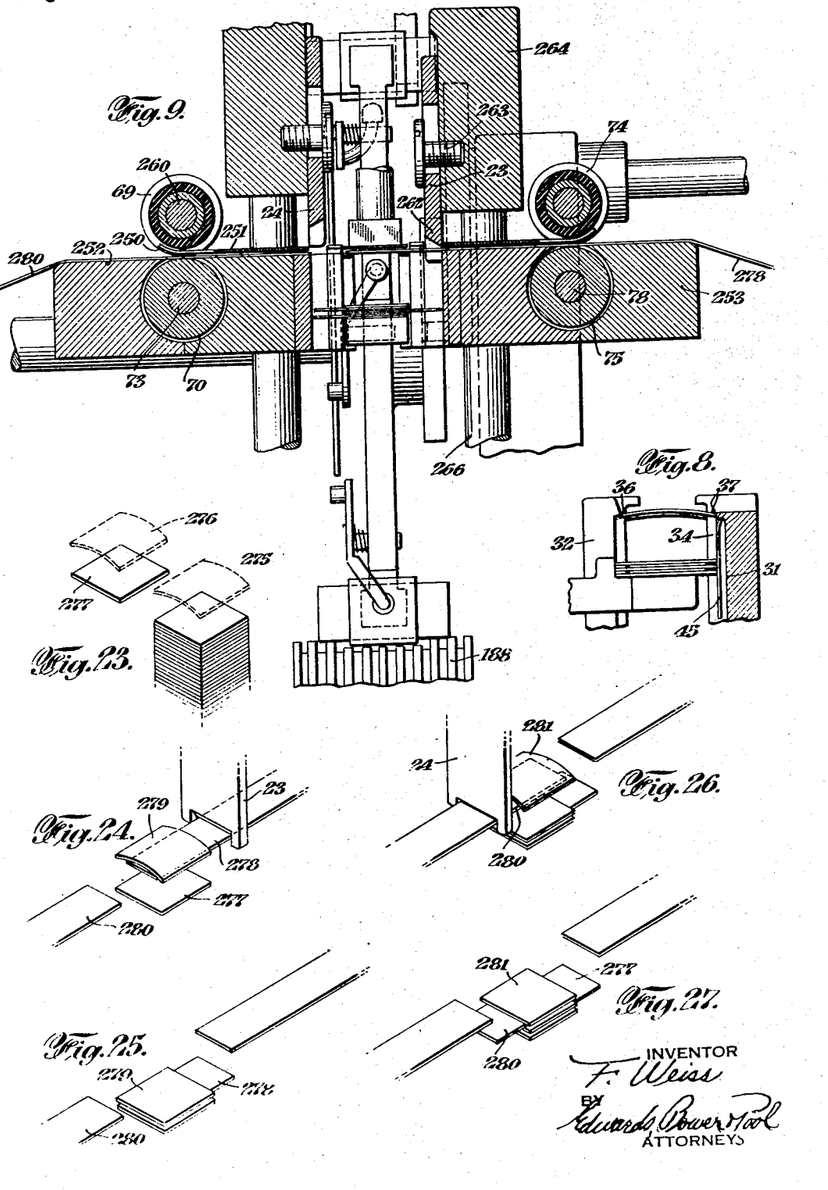
Fig. 8 shows a sectional detail of the stacking nest during a stacking process.
Fig. 9 shows a sectional detail taken at line 9—9 of Fig. 1.
Fig. 23 illustrates the mica stacking operation.
Figs. 24 to 27, inclusive, illustrate sequential steps in the stacking of a condenser in the machine.

For the purpose of severing the foil strips fed to the nest there are provided the knives 23 and 24, as shown in Figs. 8 and 9. As they are identical, only knife 23 will be described. This comprises a cutting blade 262 fastened by a screw 263 to a block 264 which is fastened to the top of a pair of pull-down rods 265 and 266. These rods are slidable through suitable holes in the frame, and the bottoms of the rods are fastened to a cross piece 267 to the middle of which is pivoted a link 268. The lower end of link 268 is pivoted to the end of a lever 269 which is pivoted to the frame at 270. The other end of lever 269 has a roller 271 which rides on cam 193 attached to shaft 164. This cam has a sharp high point 272, and every time the roller rides over it, the knife is suddenly pulled down and then let up, thus severing the foil.

The gear ratio between shafts 164 and 25 is 1:1, and the high point of cam 193 is angularly placed relative to cam 80 so that the knife 23 is brought down after every intermittent feeding of a foil strip.

A second cam and follower similar to cam 193 and its follower is also provided on shaft 164 to operate the other knife 24, the high point of the second cam being located angularly about 180° away from the high point of cam 193.

*Mica sheet feeding mechanism*

The vertically positioned hopper 19 (Figs. 1 and 6) fastened to the frame behind the stacking nest, has an internal cross section of the size and shape of the mica sheets to be used in stacking; and this hopper is filled with a stack 100 of such mica sheets. A pusher bar 101 having a flat top extends up through the bottom of the open hopper (Fig. 14) and is urged upward against the bottom of the mica sheet stack by weights 102 attached to the ends of cables 103 which extend over pulleys 104 and are fastened to the bottom of the bar. At the top of the hopper there are placed a pair of narrow shoulders 105 overhanging the upper opening of the hopper to restrain the stack of mica sheets from being pushed up through the top of the hopper by the pusher bar.

The mica sheets are picked up from the top of the hopper and placed in the stacking nest by mechanism driven from the main cam shaft 25 as follows:

Shaft 25 is provided with a cam 110 having an internal groove 111 with two pronounced high points as shown in dotted lines in Fig. 11. The cam groove is engaged by a roller 112 rotatable on a pin 113 which is fastened to a lever 114 pivoted to the frame at 115 (see Fig. 15). The upper end of the lever is linked by a pin 116 which extends across a slot 117 of an extension fastened to a slidable member 118. Member 118 is free to slide back and forth along a groove seat 119 in a bearing member 120 which is fastened to the frame.

Member 118 is provided with a pair of arms 121 and 122 through which is journaled a shaft 123 which is free to rotate but which is held against endwise movement by collars 124. At the front end of shaft 123 there is fastened an arm 125, the end of which is linked to an arm 126 which extends generally downward and links in turn with a member 127 fastened at the top of a hollow shaft 128 (see Fig. 6). A vacuum hose 150 is connected to the hollow shaft for the purpose of producing a suction at the shaft in a manner to be described later.

Figures 6, 7, 28, 29:
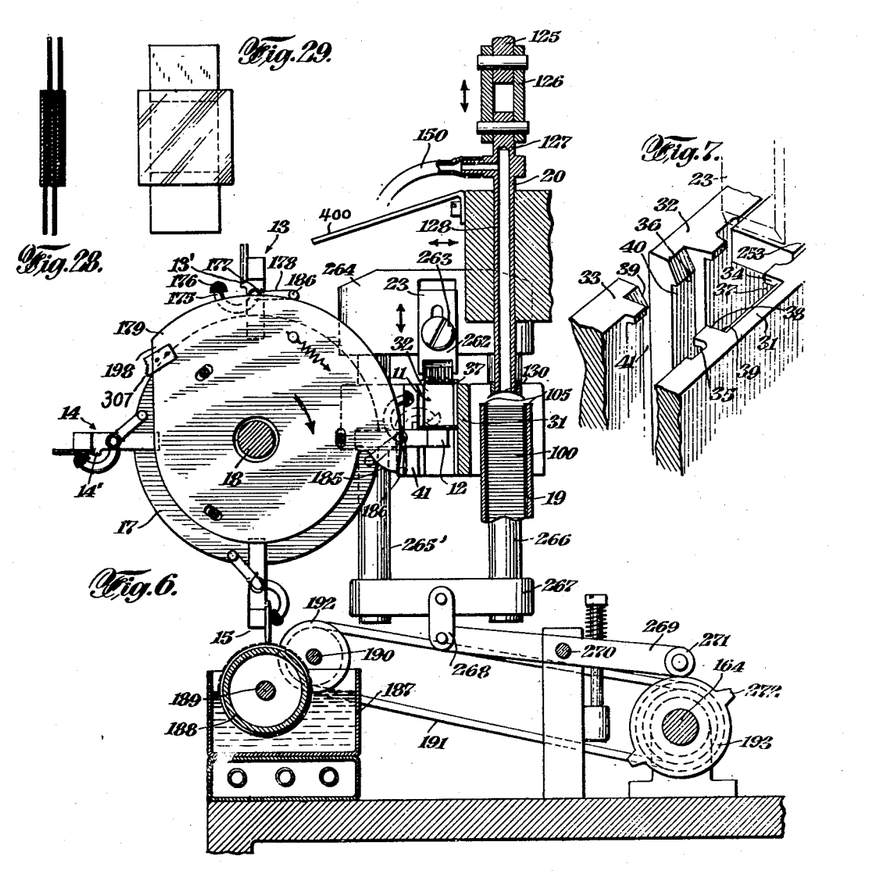
Fig. 6 shows a partial side sectional elevation taken at line 6—6 of Fig. 1.
Fig. 7 illustrates a detail of the stacking nest.
Figs. 28 and 29 show side and top views respectively of a condenser which has been stacked in the machine.

The lower end of hollow shaft 128 is concave shaped as shown at 130 in Fig. 6. The hollow tube 128 extends through a vertical slide bearing in sliding member 118, and is movable up and down in the following manner. A cam 140 fastened to shaft 25 has a groove 141 inside its rim, with four high points; and a following roller 142 rotatable on a pin 143 which is fixed to a bar 144, follows the cam. Bar 144 is free to move vertically within a slide 145 fastened to the frame. At the top of the bar there are fastened two pins 146 and 147. These pins retain between them an arm 148 having one end fastened to shaft 123.

Thus, when cam 110 rotates, the hollow tube 126 is moved frontwards and backwards from a position over the mica hopper to a position over the stacking nest; and since there are two high spots on the cam 110 the tube travels back and forth twice during every revolution of shaft 25 from the hopper to the nest. By the action of cam 140, the hollow tube is moved up and down within its slide, since the up and down movement of bar 144 acts to rotate shaft 123 for a portion of a revolution. Since there are four high points on cam 140 the hollow tube moves down and up four times per revolution of shaft 25; and these high points are so related to the high points of cam 110 that every time the tube reaches a position over the hopper and over the nest, the tube is moved rapidly down and then up so that its lower end protrudes briefly into the hopper or the nest as the case may be.

Figure 16:
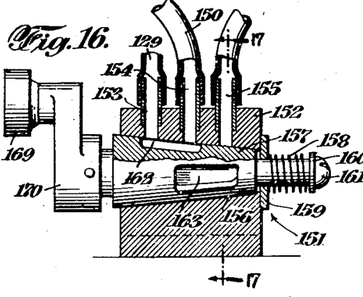
Fig. 16 shows in section a vacuum valve used with the mica conveyor.
Figure 17:
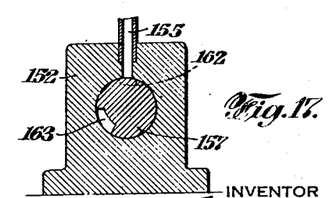
Fig. 17 is a sectional view taken along line 17—17 of Fig. 16.

To enable the hollow tube to lift mica sheets one at a time from the hopper there is provided a vacuum pump (not shown) which continually pumps while the machine is running. A vacuum hose 129 extends from this pump to a valve 151 (see Figs. 1, 16 and 17) which comprises a box 152 having an opening 153 over which is fitted the vacuum hose 129 from the pump. Another opening 154 into the box has connected with it the vacuum hose 150 leading to the hollow suction tube 128. The valve box also has a vent opening 155 leading either to the atmosphere or to a pressure pump, as desired. The three openings 153, 154 and 155 into the box each lead to a circular cone 156 formed in the box into which is fitted a correspondingly tapered rod 157 held against the taper of the cone by a spring 158 compressed between a washer 159 on the outside of the box and a washer 160 which is against the head of a stud bolt 161 extending out from the end of the conical rod 157. Rod 157 is provided with a slot 162 which connects the two box openings 153 and 154 together when properly turned so that the suction from the pump is applied through hose 129, slot 162 and hose 150 to the hollow stacking tube 128. But when the conical rod is turned away from this position another slot 163 connects the opening 154 with the vent opening 155 so that no suction is applied to the tube 128, but pressure will be applied to tube 128 if opening 155 be connected to pressure instead of the atmosphere.

For the purpose of operating the vacuum valve, there is provided (see Fig. 1) a valve cam shaft 164 driven from the main cam shaft 25 through gears 165, 166 and 167, the gears 165 and 167 being fastened respectively to shafts 25 and 164, gear 166 being an idler. A valve cam 168, fastened to shaft 164 has two high points which engage a roller 169 on an arm 170 attached to the tapered valve rod 157 so that every time the roller is lifted by a high point the slot 162 is rotated to connect valve openings 153 and 154, and every time the roller is off a high point, slot 162 is away from the openings and slot 163 is turned to connect openings 154 and 155, as shown in Fig. 16.

The valve cam 168 is so adjusted on its shaft 164, relative to the cams 110 and 140 that the valve is turned to the position which applies vacuum to the hollow rod 128 when the lower end of the hollow rod comes down into contact with the mica stack in the hopper; and the vacuum is maintained from that time until the hollow rod is moved forward and down into the stacking nest by its operating cams, whereupon the vacuum valve shuts off the vacuum and connects the hollow rod with the atmosphere—or with the pressure pump, if used—allowing the mica sheet held at the bottom of the hollow rod and already snapped past ledges 36, 37, 38 and 39, to drop—or be blown down if pressure be used.

*Condenser binding and ejecting mechanism*

The four condenser stacking platforms 12, 13, 14 and 15, all extend radially from disc 17 at right angles to each other. There is associated with each platform a clamping device (see Figs. 3, 6 and 18) comprising a finger 175 provided with a clamping knob 176 of a soft material such as rubber, the knob being urged toward the face of the platform by a helical spring 177. An arm 178 protruding from the finger 176 engages with the surface of a cam 179 attached to the frame. This cam is so shaped and arranged that when any of the four platforms is in its stacking position forming the bottom of the nest, its clamping finger 175 is held away from the platform against the force of the spring 177 by the cam, so as not to obstruct the stacking operation. When the stacking is completed, the shaft 18 carrying the disc 17 is rotated one-quarter revolution so that the stacked platform, for example 12, passes downward through the bottom of the nest.

The mechanism for producing the one-quarter revolution is a Geneva movement (Fig. 18). This comprises the slotted Geneva disc 180 having four radial slots 181 at right angles to each other, the Geneva disc 180 being fixed to disc 17, and a cooperating roller 182 mounted on a pin fixed in a Geneva arm of disc 183 which is fastened to a shaft 184. The roller engages successively in the successive slots of the Geneva disc 180, so that when shaft 184 makes one revolution the shaft 18 is rotated one-quarter revolution, bringing the next platform 13, into stacking position.

The cam 179 is shaped to have an abrupt recession 185 just below the point where the knob 186 of finger arm 178 rests when its platform is in the stacking position. When the stacked platform is about to move down, the clamping knob 176 is caused to clamp down on the stack by the following mechanism. Cam 179 is shouldered against a member 300 fastened to a bushing 301 placed freely over shaft 18, member 300 being fastened to the frame against rotation. Cam 179 is held on member 300 by pins 302 carried by the member and passing through elongated slots 303 in the cam 179 and is permitted a limited degree of rotation as determined by the length of the slots. A tension spring 304 fastened between a pin 305 on fixed member 300 and a pin 306 on cam 179 serves to keep the cam normally in its most clockwise position (with respect to Fig. 3). There is fastened to cam 179 an arm 307 having a tip 308 which is engaged by the Geneva arm roller 182 just after the Geneva arm starts to rotate and before the roller enters the Geneva slot to move the platform. This striking of tip 308 momentarily rotates cam 179 in a counterclockwise direction (with reference to Fig. 3) so that knob 186 drops into recession 185 allowing knob 176 to clamp the stack.

There is placed beneath the platform disc 17 a container 187 (Fig. 6) which holds an adhesive substance such as paraffin and which may be provided with a suitable heating element for keeping the paraffin or adhesive substance melted in the container. For applying the substance to the stacked condensers there is placed in the container a grooved wheel 188 on a shaft 189 which is geared to a shaft 190 driven from shaft 164 by a belt 191 and sprockets 192 and 193. The lower portion of wheel 188 dips into the melted paraffin, carrying it around with the wheel. This wheel is so arranged relative to the condenser platforms that when the platform bearing the stacked condenser is rotating through its lowermost position the outermost edge of the condenser stack engages the rotating wheel, which thereby applies the melted paraffin to the condenser. When the platform is then rotated for the next quarter revolution the paraffined condenser is carried away from the wheel so that the paraffin solidifies, thereby holding the stacked parts of the condenser together.

Figure 1:
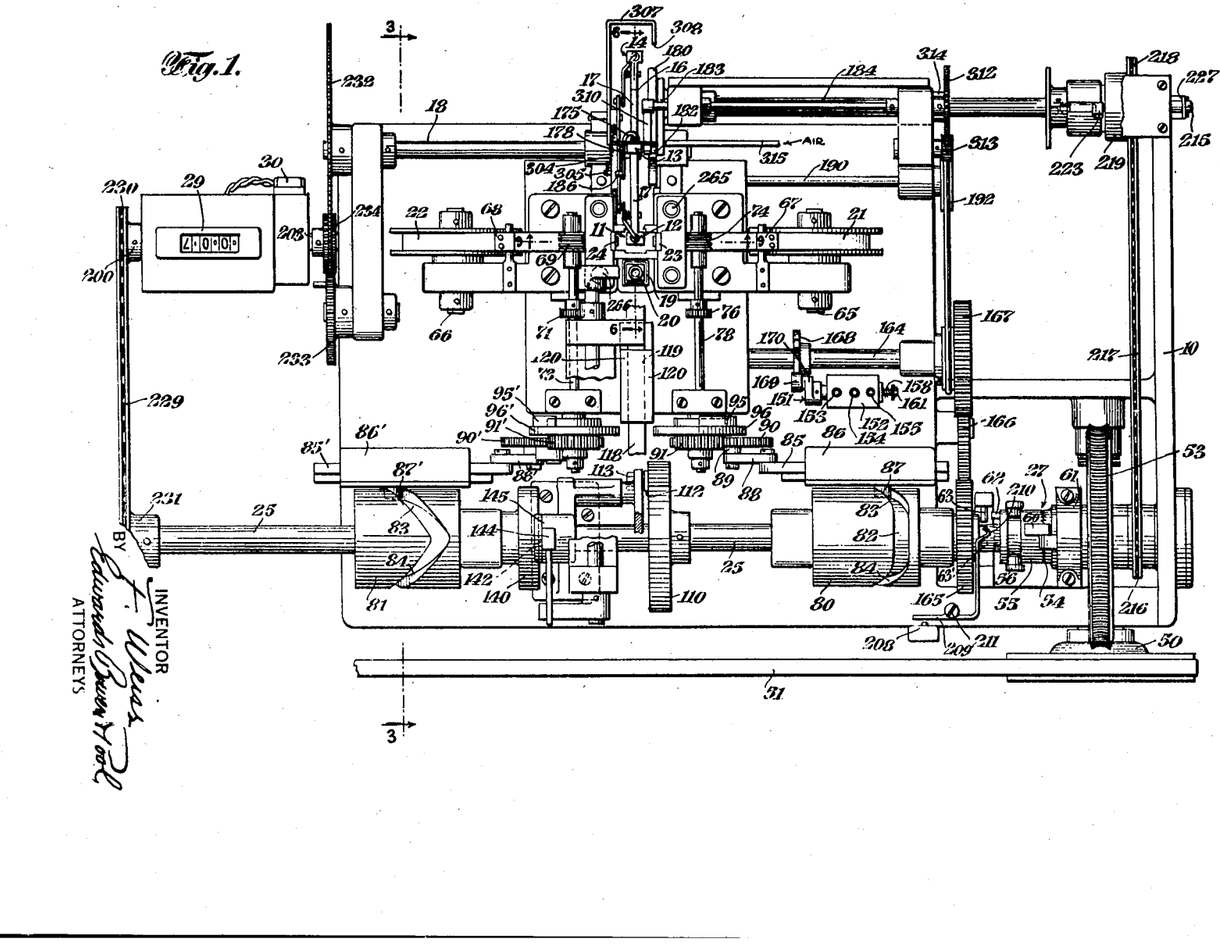
Fig. 1 shows a top view of the machine.
Figures 4, 10, 20, 21, 22:
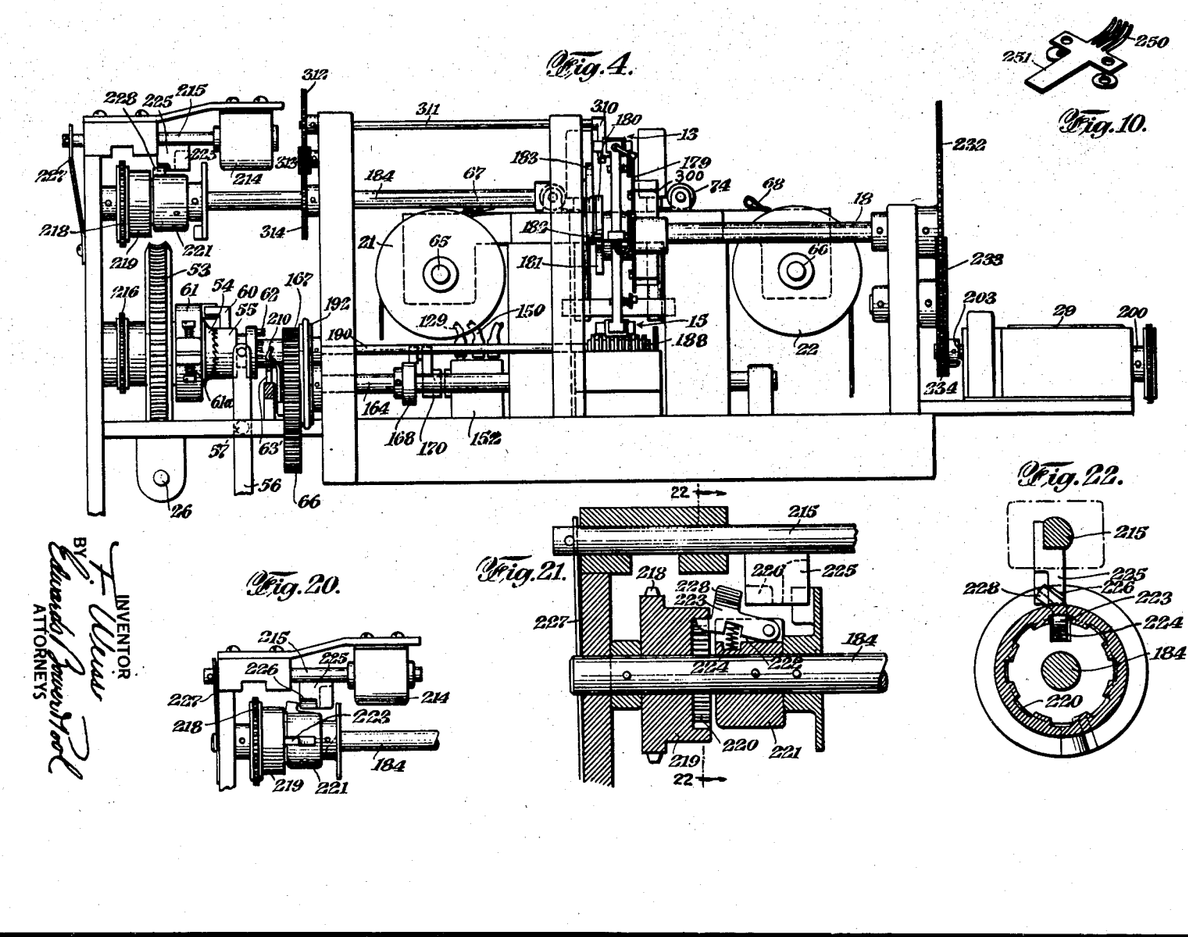
Fig. 4 shows a front elevation of the machine.
Fig. 10 shows in perspective a detail used with the foil feed rollers.
Fig. 20 shows a detail of a clutch drive through which the Geneva movement is operated.
Fig. 21 shows a detail of this clutch in a section.
Fig. 22 shows a section taken along line 22—22 of Fig. 21.

During the succeeding quarter revolution of shaft 18 the platform 12 is carried up and during this travel the raised portion 198 of cam 179 causes knob 176 to retract from its clamping position on the stack. To remove the stack from the platform to which it will probably adhere due to the paraffin, there is provided a hooked wiper arm 310 (Figs. 1, 4 and 18). This wiper arm is attached to a shaft 311 driven by the engagement of gear 312 with an idler 313 which is driven by a gear 314 fastened to shaft 184. Shaft 311 rotates at the same rate as shaft 184, and the wiper arm 310 is positioned on shaft 311 so that the wiper arm is brought up under the foil edge of the stack after shaft 184 has operated to move the Geneva through its 90°. To facilitate the removal of the condenser from the platform there may be provided an air blast through pipe 315 which sends a blast of air against the condenser just as the wiper arm comes up under its edge; and also a shaver arm 400 fastened to slidable member 118, so that when member 118 slides forward in carrying a mica sheet to the nest, the shaver arm 400 pokes the condenser off the platform. The released condenser then falls down a suitable chute 316 (see Fig. 3).

Layer counting mechanism

The counter 29 can be preset by the operator of the machine to establish the number of layers of foil and mica sheets which will be stacked upon each stacking platform; and the counter operates to close the switch 30 when the preset number of counter revolutions is reached. The counter shown is of a well known type comprising a number of tumblers and a tumbler bar. Since such counters are well known, constructional details of it are omitted except for the following brief description of those of its points which cooperate with the switches of the machine. It comprises a counter shaft 200 on which are mounted a number of tumblers 201 (see Fig. 19), each tumbler bearing ten digits numbered 0 to 9, spaced around its circumference, the tumblers being settable by the operator to read the desired number. The tumblers are provided with notches into which a tumbler bar 202 enters when the tumbler notches are all lined up. Rotation of the counter shaft 200 turns the tumblers until the preset number of revolutions is reached, whereupon the notches line up, allowing the bar to tumble in. Tumbling of the bar closes the switch 30 by rotating shaft 202a slightly on its pivots so that movable contact 30a supported on shaft 202a touches fixed contact 30b.

Shaft 203 is the resetting shaft which is customarily provided in counters of this type. One revolution of shaft 203 operates to turn all the tumblers back to zero so that the counting of revolutions of the counter shaft starts over again. Shaft 203 operates to open the switch 30 when the counter is reset to zero, for then the tumbler bar 202 is returned to its untumbled position.

Figure 19:
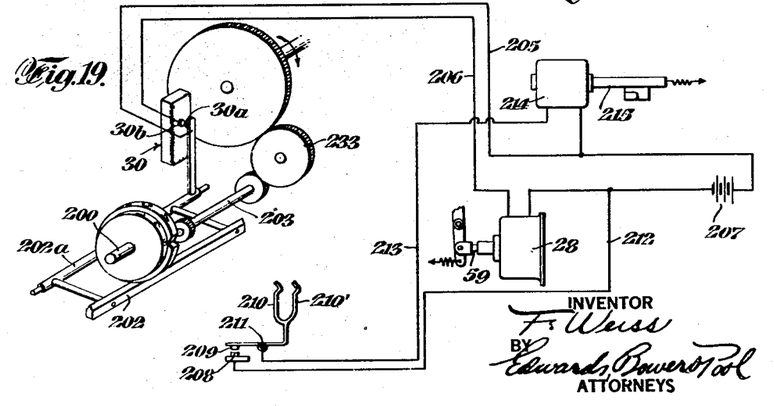
Fig. 19 shows a wiring diagram of the electrical system of the machine.

Switch 30 when closed, energizes magnet 28 over wires 205 and 206 from a power source 207, as shown in Fig. 19, so that when this magnet is energized its armature 59 is pulled into the magnet, disengaging clutch member 55 from 54.

Referring to Figs. 1 and 19, when clutch member 55 is in its disengaged position, the spring arms 210 and 210' of a switch contact 209 lies in the path of lug 62, so that the pair of switch contacts 208 and 209 are momentarily closed by the lug 62 momentarily striking on the other of these two spring arms and rotating them and their contact 209 on pivot 211 while the lug 62 is being moved toward the corresponding stop 63 or 63' by the brake drive 61. The momentary closure of the contacts momentarily completes the circuit from the source of voltage 207 through wires 212 and 213 and a magnet 214, thereby pulling in its plunger 215 (see Fig. 20).

This magnet plunger 215 operates to engage a clutch on shaft 184 which rotates that shaft. This clutch and its drive (Figs. 2 and 20–22) comprise a sprocket wheel 216 fastened to shaft 25 coupled by a chain 217 to a sprocket wheel 218 fastened to a clutch member 219, having internal clutch teeth 220, the members 218 and 219 together being free to rotate on the shaft 184. There is fastened to shaft 184 a clutch block 221 having pivoted in its slot 222 a dog 223 which extends within the clutch teeth 220 and is urged outward into engagement with the teeth by a compression spring 224. When thus engaged the clutch drives shaft 184. Plunger 215 has attached to it a lug 225 having a concaved engaging portion 226 which, in the deenergized condition of the magnet 214, is pulled out from the magnet by leaf spring 227 to engage a lug 228 on dog 223 and thus hold the dog pivoted out of engagement with the teeth 220 on clutch member 219. Upon the momentary pulling in of the plunger 215 by momentary energization of the magnet 214, the lug 225 is disengaged from 228, causing the dog 223 to engage the teeth 220 under action of spring 244, thus causing block 221 and shaft 184 to which it is fixed, to rotate for one revolution. When the single revolution is complete the dog is again disengaged from the teeth 220 by the camming of its lug 228 on the concaved portion 226 of the lug 225 which immediately after the start of the revolution springs out under action of spring 227, since the magnetization of 210 was only momentary. This single revolution of shaft 184 causes shaft 18 to rotate one-quarter revolution by action of the Geneva movement (Fig. 18) during which the succeeding stacking platform is moved into stacking position.

Figure 5:
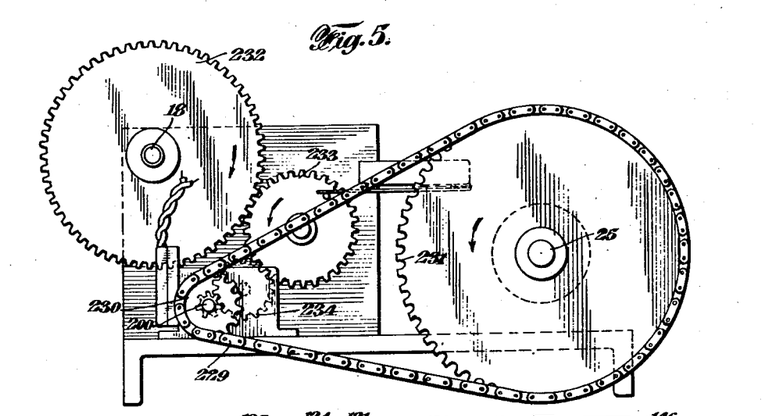
Fig. 5 shows an elevation of the gear train looking at the left side with reference to Fig. 1.

The counter shaft 200 is rotated from the main cam shaft 25 by a chain 229 engaging with sprockets 230 and 231 on shafts 200 and 25 respectively (Figs. 1 and 5). The gear ratio between the shafts 200 and 25 can be established as desired, but in this particular embodiment the ratio is preferably 2:1 (two for the counter shaft to one for shaft 25). The reason for this particular ratio being preferable is that two layers of foil and mica are laid on the stacking platform for every revolution of shaft 25, so that with the 2:1 counter ratio the counter will count directly the number of foil and mica layers.

The counter resetting shaft 203 is driven from shaft 18 by the train of gears 232, 233 and 234, the gears 232 and 234 being fixed on shafts 18 and 203 respectively, and gear 233 being an idler between them. The gear ratio between the shaft 18 and the counter resetting shaft 203 should be 4:1 in this machine (four for the resetting shaft and one for shaft 18), the reason for this being that the quarter revolution which shaft 18 makes in moving from one platform position to the next must rotate the resetting shaft 203 for its full revolution which is required to reset the counter.

Modifications

Figures 30, 31, 32:
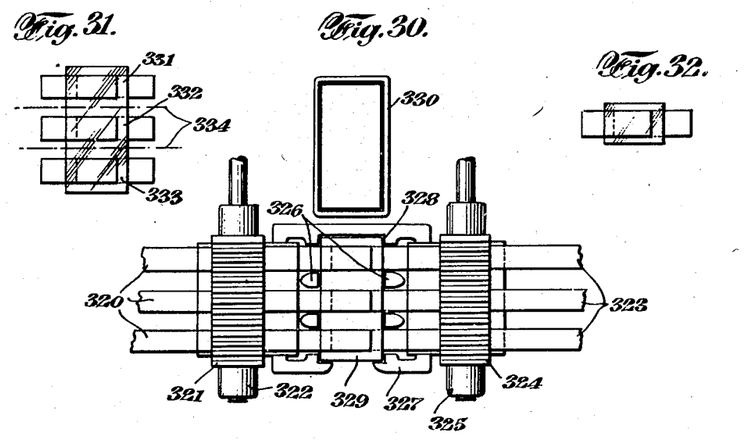
Fig. 30 shows a modification of the machine for stacking multiple condensers.
Fig. 31 shows a multiple condenser stacked by the modified arrangement of Fig. 30.
Fig. 32 shows a single condenser taken from the multiple condenser of Fig. 31.

Fig. 30 shows a modification of the stacking nest and its associated hopper and foil feeds capable of stacking a multiple condenser which in this example contains three individual condensers. Foil strips 320 from three foil rolls are fed through a pair of large foil feeding rollers 321 and 322 from one side of the nest and three corresponding foil strips 323 from three other foil rolls are correspondingly fed into the other side of the nest through feed rollers 324 and 325, these foil feeders being operated by mechanism similar to that already described. Guides 326 serve to keep the foils entering the nest properly spaced apart. The nest 327 is enlarged to receive the three foil strips, and is provided with overhanging ledges 328 at the corners similar to the ledges of the nest previously described. The mica sheets 329 are of a size to snap into the nest past the ledges and to cover all the foils; and the mica hopper 330 is made of a correspondingly large size. The multiple stack comprising three individual condensers 331, 332 and 333, as shown in Fig. 31, may be severed into individual condensers as shown in Fig. 32 by severing along the broken lines 334.

Figure 33:
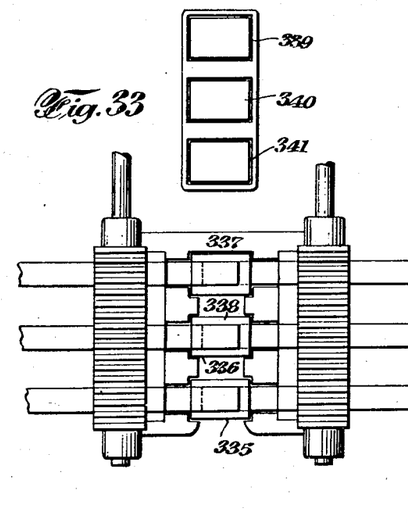
Fig. 33 shows another modification of the machine.

Another modification of the multiple stacking arrangement is shown in Fig. 33 which shows three individual nests 335, 336 and 337, instead of one large nest as in Fig. 30. The foil strips are fed into the individual nests from either side in the same way as in Fig. 30, but the micas 338 instead of being large sheets covering all the foils, are small sheets adapted to fit into the individual nests. There are therefore used three mica hoppers 339, 340 and 341 spaced apart to correspond with the nest spacings; and there will be used three mica conveying rods.

Operation

The operator leads the two foil strips from rolls 21 and 22 between their respective feed rollers and strippers to the respective knife edges, and fills the hopper 19 with mica sheets. He also presets the counter to establish the number of layers of foil and mica desired for each condenser. The electric power is turned on, starting the driving motor which causes clutch member 54 and gear 53 to rotate continuously, and also causes sprocket wheel 218 and its clutch member 219 to rotate continuously. Since magnet 28 is still de-energized because switch 30 is still open, spring 58 holds the teeth of clutch member 55 in engagement with the teeth of member 54, and the main cam shaft 25 rotates.

A high point of cam 110 engages its follower causing the hollow mica conveying rod 128 to move over the mica hopper by sliding member 118; and a high point of cam 140 then moves under its follower, causing the mica rod to be pushed down into contact with the top mica sheet in the hopper. Vacuum valve 151 then has its tapered rod 157 rotated by action of cam 168 so that slot 162 is positioned to apply vacuum from the vacuum pump to the hollow rod and thus cause the top mica sheet to cling to the concaved hollow 130 on the bottom of the rod. This concavity of the rod flexes the mica sheet, enabling its edges to clear the retaining ledges 105 and thus permit the sheet to be lifted out of the hopper, as shown in Fig. 6. As the relatively sharp high point of cam 140 passes beyond its follower the plunger rod 128 is lifted upward. The rather broad high point of cam 110 then passes beyond its follower, causing the rod 128 to move forward to a position directly over the stacking nest.

The next sharp high point of cam 140 then causes the rod to come down into the top of the nest where the mica sheet is snapped past the ledges 36, 37, 38 and 39 (Fig. 8). After the mica sheet is below the ledge, the slight depression 300 on cam 110 causes the mica plunger to make a very slight further horizontal movement toward the front so that the edge of the mica sheet is carried into direct contact with the heel of the platform. At this moment, cam 168 turns the vacuum valve rod 157 to shut off the vacuum, thus causing the mica sheet to drop down in an unflexed condition on the stacking platform which is in the stacking position; and the mica rests within the four corners 32, 33, 34 and 35 which establish the mica position of the nest. Further rotation of cam 140 causes the plunger to rise, leaving the mica in the nest; and then cam 110 operates to carry the mica plunger back over the mica hopper again.

Fig. 23 illustrates the carrying over of the top mica sheet from the stack. The dotted outline 275 shows the flexed sheet as it is being lifted from the hopper, and dotted outline 276 shows it as it is coming down over the nest. At 277 it is shown unflexed as it is in the nest.

While the mica plunger is returning to the mica hopper, the cam follower of one of the foil feeding cams, for example, follower 85, moves endwise in the direction to cause the ratchet 92 to turn shaft 78 and thus feed the foil strip past knife 23 and into the nest over the mica which has just been laid. The stroke of follower 85 is so related to the degrees rotation of the foil roll 74 that the end of the foil strips reaches a position somewhat inside the far edge of the mica sheet, as shown in Fig. 24. During part of this time the other foil cam follower 85' is moving in the same direction, but since in this direction its ball ratchet 92' does not engage, foil roll 22 does not feed foil.

Then another mica sheet is carried to the nest as before and laid over the foil which has just been fed; this last mica taking a position directly over the first one. As the rod bearing this second mica is coming down into the nest, the high point of cam 193 operates knife 23 to sever the fed foil strip under it; so that the descending plunger rod with the mica sheet pushes the severed foil down flat over the previous mica. The position of the foil severing knife 23 some distance outside the edges of the mica sheets leaves a foil end protruding from between the two mica sheets, as shown in Figs. 24 and 25.

Following the laying of the second mica, and as the mica plunger returns to the hopper, foil strip is fed into the nest from the other foil roll 22, this being fed by action of foil feeding cam 81 moving its follower 85' in the direction which causes its ball ratchet 92' to feed the foil, foil roll 221 now being at rest because its ball ratchet 92 is now disengaged. Knife 24 is then caused by its operating cam on shaft 164 to sever this foil strip while the next succeeding mica is being brought to the nest, this severing leaving a foil end protruding from the side of the mica sheets opposite the previous foil end, as shown in Figs. 26 and 27.

This stacking sequence and the positions of the sheets are illustrated in Figs. 24 to 27.

Fig. 24 shows the prescribed length of foil 278 from roll 21 fed over sheet 277 and the second flexed mica sheet 279 as it is coming down on the end of the vacuum rod. Knife 23 is shown in its position ready to cut the foil. The opposite foil strip 280 from roll 22 has not yet moved past its knife (not shown in this figure).

Fig. 25 shows foil strip 278 after it has been severed and pushed down into the nest by mica 279 which now lies flat over the foil. The edge of foil strip 278 lies within the edges of the micas, as determined by the corner pieces 32, 33, 34 and 35 of the nest, except where the foil end protrudes toward its knife.

Fig. 26 shows the other foil strip 280 already fed into the nest with the third mica 281 coming down over it in the flexed condition, the knife 24 being about to cut the foil.

Fig. 27 shows foil 280 severed and pushed down on the stack with the now unflexed mica 281 over it.

Fig. 28 shows a side view and Fig. 29 a top view of a stack which has progressed as far as having two sheets of foil and three sheets of mica, the dotted lines representing the outlines of the foils within the edges of the micas.

This alternate stacking of mica and foil sheets is continued until the number of layers corresponding to the predetermined setting of counter 29 is reached. At this point the counter-operated switch 30 is closed by the tumbling of counter bar 202, thereby energizing magnet 28 (see Fig. 19) which disengages the teeth of clutch 27 and causes the clutch member 55 to continue to be driven only by friction brake 61 around to the point where lug 62 strikes stop 63 or 63'. Lug 62, just prior to reaching the stop, strikes switch arm 210, momentarily closing switch contacts 208 and 209, thus momentarily energizing magnet 214 over wires 212 and 213, which pulls plunger 215 into the magnet. This retracts lug 225 from 228, allowing dog 223 to engage with the teeth 220 of clutch member 219 and thus rotate shaft 184 for exactly one revolution, where it is stopped when the lug 228 again strikes lug 225, which in the meantime has returned to the obstructing position since the energization of magnet 214 was only momentary. This operates the geneva to rotate shaft 18 through one-quarter revolution, thus bringing the next stacking platform 13 into stacking position in the nest and moving the platform 12 bearing the already stacked condenser into the lowermost position, the stacked condenser being held from falling off the platform by knob 176 on finger 175 which is allowed to press against the stack by the indent 185 of cam 179 after the slight rotation of this cam which occurs just before the platform begins to move down from its stacking position.

During this one-quarter revolution of shaft 18, the counter resetting shaft 203 is rotated a full revolution due to the 4:1 gear ratio between them, thus resetting the counter to its original position and opening counter switch 30 by action of lug 204 so that magnet 28 is de-energized, thus permitting the teeth of clutch members 54 and 55 to engage again and cause stacking of the next condenser on new platform 13, in the manner already described.

While the stacked platform 12 is in its low position, the outer edge of its stacked condenser which overhangs the platform (Fig. 6) is carried into contact with the paraffin covered wheel 188, allowing paraffin to cover this edge and to seep into the layers. Then, during the time this platform is held in its horizontal position opposite the stacking position after the next quarter turn of shaft 18, the paraffin solidifies, so that the next time shaft 18 moves one-quarter revolution and reaches the delivery chute, the wiper arm 310 lifts one edge of the condenser which has probably adhered to the platform, and the air blast from pipe 315 blows it off into the chute.

This application is a division of application No. 349,725, filed August 2, 1940, issued as Letters Patent No. 2,352,926, July 4, 1944.

I claim:

1. A method of building condensers comprising providing insulating pieces cut to size and in stack formation and simultaneously providing a supply of continuous conductive foil, flexing the top insulating piece to separate it from its stack, removing said separated piece to a point of assembly and depositing it there, feeding an end portion of said conducting foil in position above the previously deposited insulating piece there, flexing another insulating piece to separate it from its stack and transferring said piece to a position over the end of said conducting foil and in alinement with said previously deposited insulating piece, and severing said foil end and depressing said insulating piece above it so that the descending insulating piece pushes the severed foil down flat over the insulating piece, and continuing said operations until a predetermined number of insulating pieces and foils has been built up into the desired condenser structure.

2. The method as set forth in claim 1 in which the insulating pieces in the assembly nest are resiliently pressed into contact with an opposite guiding surface.

3. The method of stacking condensers which comprises laying rectangular sheets of insulating material one above the other in succession, feeding a conducting strip edgewise over one edge of each insulating sheet before the next insulating sheet is laid so that the end of said strip forms a conducting sheet lying within the remaining three edges of the insulating sheet excepting that edge over which it was fed, severing the conducting strip at a distance outside of the edge of the insulating sheet over which it was fed to form a conducting tab, the alternate conducting sheets being fed from a different side from that which the other alternate sheets were fed so that the alternate conducting tabs lie on top of each other, and completing the stacking by laying a top insulating sheet over the uppermost conducting sheet.

4. The method of stacking a condenser which comprises laying an insulating sheet of rectangular form, feeding over one edge thereof a conducting strip sliding it edgewise into place so that it lies within the three remaining edges of said insulating sheet excepting that edge over which it was fed, severing the conducting strip at a distance outside the edge of the insulating sheet over which it was fed, laying another insulating sheet over the severed conducting strip with the edges alined with the edges of the first insulating sheet, then feeding over one edge of the last mentioned insulating sheet a conducting strip so that it lies within the edges of the insulating sheet excepting the edge over which it was fed, then severing the last mentioned conducting strip at a distance outside the edge of the insulating sheet over which it was fed, and repeating these operations to the accumulation of the desired number of conducting strips, and then completing the stacking by laying a top insulating sheet over the uppermost conducting strip.

5. The method of stacking condensers of foils and relatively stiff insulating sheets of rectangular form which comprises laying an insulating sheet at a point of assembly, feeding a foil strip edgewise in its plane to the point of assembly above said sheet, stopping said feed to position the end of said strip vertically in place within three edges of said sheet and intersecting the vertical plane through the other edge thereof, cutting said foil strip along a line outside of said plane to leave a protruding tab on said end, positioning a second insulating sheet vertically above and in substantial alinement with said deposited sheet and carrying it downward to press it on said foil and force it into intimate contact with said first deposited sheet, feeding a second foil strip edgewise in its plane in a direction opposite to the first feed and stopping said feed to position the end of the foil vertically in place within three edges of said sheet and intersecting the vertical plane through the other edge thereof, cutting said foil strip along a line outside of said plane to have a protruding tab on said foil end, and then repeating the depositing of said insulating sheets with alternate interposing of the foil strip ends from opposite directions to a desired number of foil ends, and then adding a top insulating sheet to complete the stack.

6. The method of forming a condenser which comprises stacking successive pieces of insulating and interleaved conducting pieces, gripping the stacked assembly by pressure on its opposite faces, moving said gripped stack to a vertical position while maintaining the gripping action, supplying a fluid binding medium to the lowermost edges of said stacked pieces while held in a vertical position by said gripping pressure, moving said stack first to horizontal and then to inverted vertical position while continuing said gripping pressure, and then releasing said gripping pressure to deliver said stack.

FELIX WEISS.

REFERENCES CITED

The following references are of record in the file of this patent:

UNITED STATES PATENTS

| Number | Name | Date |
| --- | --- | --- |
| 1,229,915 | Dubilier | June 12, 1917 |
| 1,345,754 | Dubilier | July 6, 1920 |
| 1,505,600 | Pickard | Aug. 19, 1924 |
| 1,735,609 | Frederick | Nov. 12, 1929 |
| 1,740,177 | Horton | Dec. 27, 1929 |
| 1,785,479 | Dubilier | Dec. 16, 1930 |
| 1,941,106 | Park | Dec. 26, 1933 |
| 2,350,887 | Goff | June 6, 1944 |